US006970862B2

(12) United States Patent
Kwan (10) Patent No.: US 6,970,862 B2
(45) Date of Patent: Nov. 29, 2005

(54) METHOD AND SYSTEM FOR ANSWERING ONLINE CERTIFICATE STATUS PROTOCOL (OCSP) REQUESTS WITHOUT CERTIFICATE REVOCATION LISTS (CRL)

(75) Inventor: Nang Kon Kwan, Milpitas, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 344 days.

(21) Appl. No.: 09/867,648

(22) Filed: May 31, 2001

(65) Prior Publication Data

US 2002/0184182 A1    Dec. 5, 2002

(51) Int. Cl.[7] ............................................ G06F 17/30
(52) U.S. Cl. .............. 707/3; 707/9; 707/10; 707/104.1; 713/156; 713/158; 705/76; 705/78
(58) Field of Search ................ 707/10, 104.1, 707/2, 3, 9; 713/156, 158; 705/76, 78

(56) References Cited

U.S. PATENT DOCUMENTS

| | | | |
|---|---|---|---|
| 5,287,270 A | 2/1994 | Hardy et al. ................... 705/34 |
| 5,465,206 A | 11/1995 | Hilt et al. ....................... 705/40 |
| 5,652,786 A | 7/1997 | Rogers ..................... 379/91.01 |
| 5,684,965 A | 11/1997 | Pickering ..................... 705/34 |
| 5,699,528 A | 12/1997 | Hogan .......................... 705/40 |
| 6,070,150 A | 5/2000 | Remington et al. ........... 705/34 |
| 6,134,551 A * | 10/2000 | Aucsmith ..................... 707/10 |
| 6,233,577 B1 * | 5/2001 | Ramasubramani et al. ..... 707/9 |
| 6,487,658 B1 * | 11/2002 | Micali ......................... 713/158 |
| 6,519,571 B1 | 2/2003 | Guheen et al. ............... 705/14 |
| 6,658,488 B2 | 12/2003 | Peters et al. ................. 719/318 |
| 2002/0004773 A1 * | 1/2002 | Xu et al. ...................... 705/36 |
| 2002/0029200 A1 * | 3/2002 | Dulin et al. .................. 705/67 |
| 2002/0104000 A1 * | 8/2002 | Kang et al. .................. 713/158 |
| 2002/0116609 A1 * | 8/2002 | Yellepeddy et al. ......... 713/156 |
| 2002/0166049 A1 * | 11/2002 | Sinn ........................... 713/175 |

OTHER PUBLICATIONS

Wohlmacher, Petra, "Digital Certificates: a Survey of Revocation Methods", Proceeding of The 2000 ACM Workshop on Multimedia, Nov. 2000, pp. 111-114.*

Myers et al, "X.509 Internet Public Key Infrastructure—Online Certificate Status Protocol—OCSP", Internet Draft RFC 2560, Jun. 1999, 22 pages.*

(Continued)

*Primary Examiner*—Mohammad Ali
*Assistant Examiner*—Khanh Pham
(74) *Attorney, Agent, or Firm*—Finnegan, Henderson, Farabow, Garrett & Dunner, L.L.P.

(57) ABSTRACT

Methods and systems in accordance with the present invention efficiently validate digital certificates by answering Online Certificate Status Protocol ("OCSP") requests without Certificate Revocation Lists ("CRL"). During validation of digital certificates, these methods and systems speed transmission, reduce required bandwidth and reduce required data storage by eliminating the need for the transmission of lengthy CRLs from a Certificate Authority ("CA") when verifying a digital certificate from a client. In one implementation, they send a Lightweight Directory Access Protocol ("LDAP") database query to a CA directory server to determine and pinpoint the existence of a valid digital certificate and check its validity without receiving a long list of data, such as a CRL, from a CA. The CA directory server returns the query result, and the database query in the CA directory server is performed faster than using an entire CRL, and furthermore, the transmission of the database query result is a small piece of information and does not require the large amounts of data transmission bandwidth and storage as required with transmitting CRL's.

16 Claims, 7 Drawing Sheets

OTHER PUBLICATIONS

Rivest, Ronald, "Can We Elminate Certificate Revocation Lists?", Proceeding of Financial Cryptography 1998, Feb. 1998, pp. 178-183.*

Micali, Silvio, "Efficient Certificate Revocation", Laboratory for Computer Science, M.I.T, Cambridge, Mass. Mar. 22, 1996.*

Forne, Castro. "A Model to Evaluate Certificate Revocation". SCI'2000, Electronic Commerce invited session. Orlando (USA).*

Iliadis et al. "Evaluating Certificate Status Information Mechanisms," Proceedings of the 7th ACM Conference on Computer and Communications Security, 2000, pp. 1-8.*

Naor et al. "Certificate Revocation and Certificate Update", Proceedings of the 7th USENIX Security Symposium, Texas 1998, 12 pages.*

Hallum-Baker, "Comments on Certificate Status", Jun. 15, 1998.*

U.S. Appl. No. 60/258,087.*

U.S. Appl. No. 60/285,524.*

* cited by examiner

METHOD AND SYSTEM FOR ANSWERING ONLINE CERTIFICATE STATUS PROTOCOL (OCSP) REQUESTS WITHOUT CERTIFICATE REVOCATION LISTS (CRL)

FIELD OF THE INVENTION

The present invention generally relates to data processing systems, and more particularly, to digital certificates and their validation.

RELATED ART

With the advent of the Internet and the increasing use of large computer networks by millions of people world-wide, security against fraud becomes a paramount concern. Conducting business in the current e-commerce environment requires a level of security that can withstand intentional attempts by malicious hackers and imposters, as well as protect against accidental erroneous information due to unintentional technological errors. The ability to determine the correct identity of an online entity remains vital to e-commerce and many other computing environments, applications, and purposes. One such way of identifying online identities is through the use of digital certificates.

Digital certificates, or "certificates," are a form of electronic identification used by computers, analogous to, for example, a driver's license. They may be an attachment to an electronic message, and they attest that the issuing authority certifies that the data associated with the certificate, such as the email address of the certificate holder, is indeed accurate and trustworthy for the lifespan of the certificate. A certificate may be used for encrypting messages for the holder, and to verify signatures created by the holder. Digital certificates are described in detail in "Understanding Public-Key Infrastructure: Concepts, Standards, and Deployment Consideration," Carlisle Adams et al., New Riders Publishing (1999), and "Digital Certificates: Applied Internet Security," Jalal Feghhi et al., Addison-Wesley (1999) which are incorporated herein by reference. Certificates provide a highly-secure, bi-directional security mechanism. Not only can individual certificate holders ensure that their emails and other messages are cryptographically secure, recipients can also authenticate the identity of a message's sender. In addition, users can verify the integrity of commercial web sites with which they might perform transactions, and those same sites can use certificates to replace traditional username and password access control mechanisms.

For instance, username and password combinations are not secure. If someone steals a username and password, he can gain access to controlled data protected by the stolen username and password from anywhere in the world. It also leaves no easy way of notifying all access-controlled sites that the username and password have been compromised. A user has to remember every unique combination of usernames and passwords for every access-controlled site with which they interact.

Certificates have expiration dates after which they are no longer valid, but they may be revoked prior to that date for a variety of reasons. Like any other kind of identification, such as a credit card or driver's license, a certificate is given a finite lifespan. It expires, and once that expiration date is reached, it must either be renewed or replaced. Validation is the act of checking the status of a certificate to see whether or not it has been revoked. Revocation is the process of marking a previously-valid certificate as invalid.

Certificates are typically issued by Certificate Authorities ("CA") which are trusted third-party organizations or companies that issue digital certificates used to create digital signatures and public-private key pairs. The role of the CA in this process is to guarantee that the individual granted the unique certificate is, in fact, who he or she claims to be. For example, this may mean that the CA has an arrangement with a financial institution, such as a credit card company, which provides it with information to confirm an individual's claimed identity. CAs are an important component in data security and electronic commerce because they insure that the two parties exchanging information are really who they claim to be. An individual wishing to send an encrypted message applies for a digital certificate from a CA. The CA issues an encrypted digital certificate containing the applicant's public key and a variety of other identification information. The CA makes its own public key readily available through print publicity or perhaps on the Internet. The recipient of an encrypted message uses the CA's public key to decode the digital certificate attached to the message, verifies it as issued by the CA and then obtains the sender's public key and identification information held within the certificate. With this information, the recipient can send an encrypted reply.

CA's may also revoke certificates. The circumstances under which revocation may happen vary widely, but can include, for example, a change of employment status, theft of a computer containing the certificate's associated private key or other vital private information, or cancellation of the anticipated transaction for which the certificate was originally issued. The mechanism for revoking a certificate varies by CA, but generally, the issuer of the certificate issues a digitally-signed statement marking a particular certificate's serial number as revoked. This statement typically comes in the form of a Certification Revocation List ("CRL").

Figure 1:
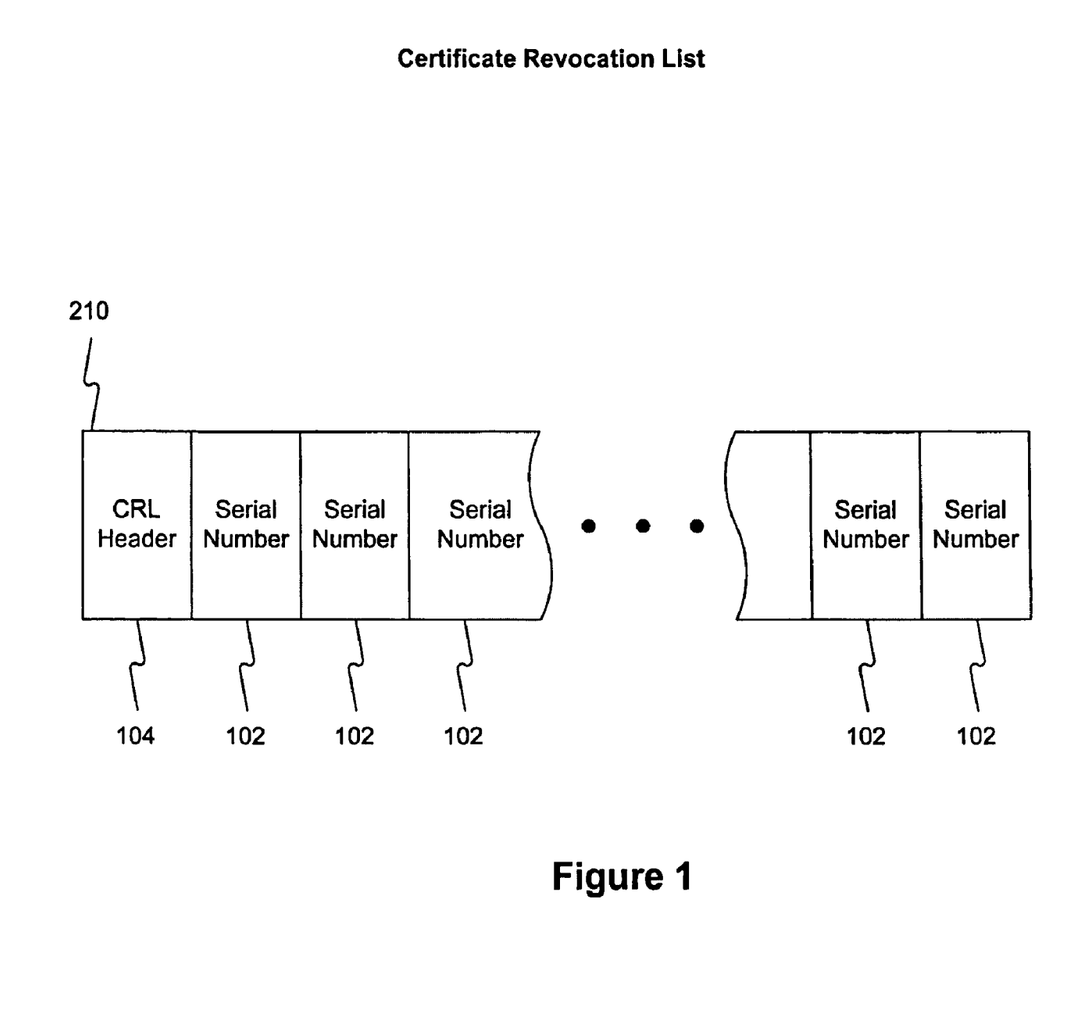
FIG. 1 illustrates an exemplary Certificate Revocation List.

FIG. 1 illustrates an exemplary CRL 210 in accordance with the present invention. A CRL 210 is the digitally-signed data issued by a CA specifying the serial numbers 102 of digital certificates it has revoked prior to their indicated expiration date. Generally, it is a long list of serial numbers 102 of revoked digital certificates, and the list itself is digitally signed by the CA. The CRL 210 may also have a CRL header 104 that has additional information including, for example, the issuer's name and other information.

The Online Certificate Status Protocol ("OCSP") is a commonly used, real-time online mechanism for getting up-to-date status information on digital certificates. It is offered by the Internet Engineering Task Force ("IETF") as a proposed industry standard for certificate validation and is widely used. OCSP is described in greater detail in "Understanding Public-Key Infrastructure: Concepts, Standards, and Deployment Consideration," Carlisle Adams et al., New Riders Publishing (1999), which was previously incorporated herein by reference. On a network such as the Internet, when a client computer makes a transaction request to a server computer, it may supply a certificate for authentication, and the server computer may verify the client identity using the certificate. It typically does so by sending an OCSP request to an OCSP computer which checks the validity of the certificate with a CA.

Figure 2:
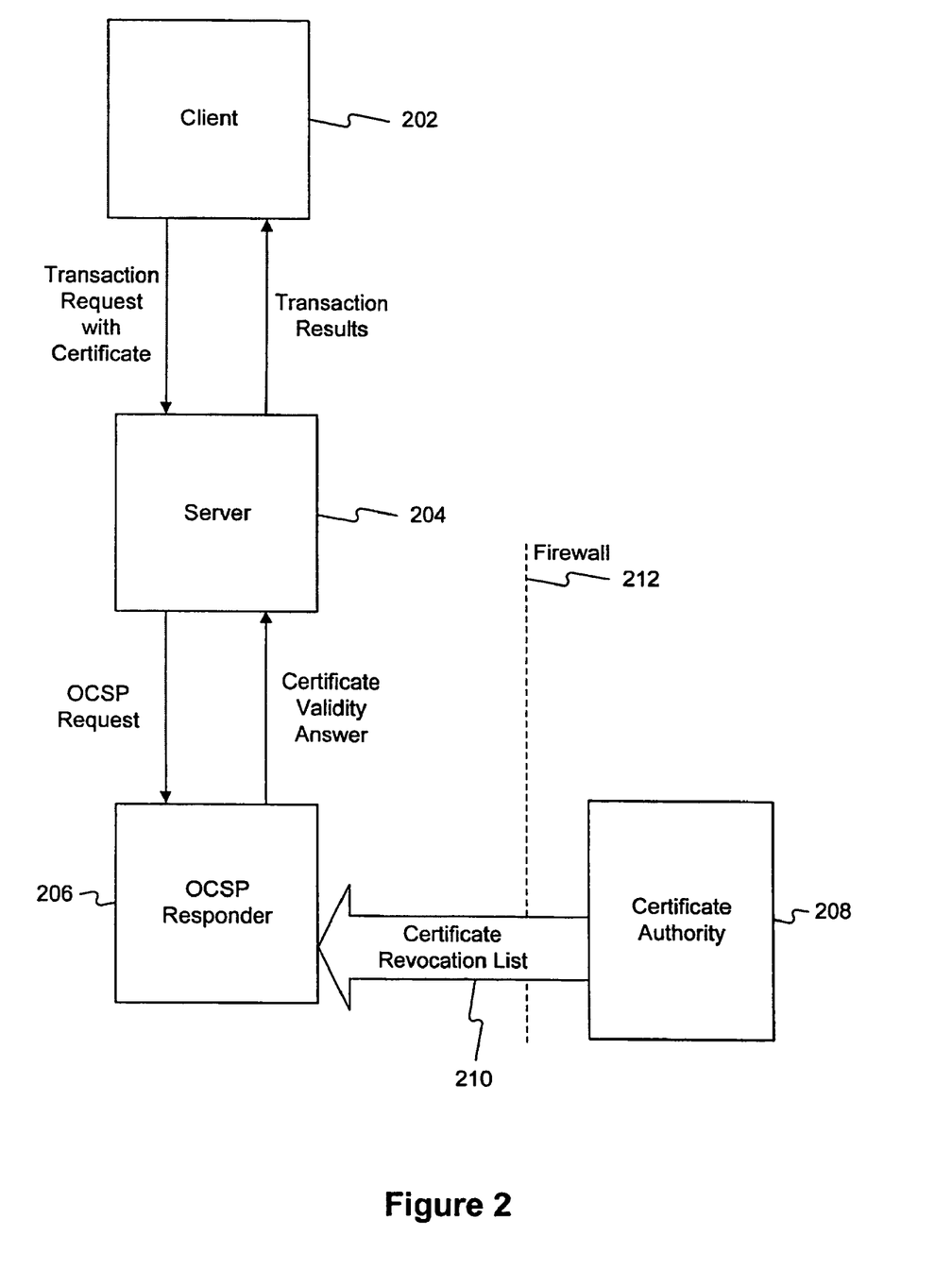
FIG. 2 depicts an OCSP system using CRLs for digital certificate verification.

FIG. 2 shows a system for answering OCSP requests with CRL's. A client computer 202 makes a transaction request over a network to a server computer 204 having the ability to process the client's requested transaction, such as an e-commerce application. When making this request, the client computer 202 sends a certificate to the server so that the server may verify that the client has the authority to make the request and receive results of the transaction. Upon receipt of the transaction request and the certificate, the server 204 attempts to verify the certificate before executing the requested transaction by making an OCSP request to an OCSP responder 206. To do so, the server 204 constructs an OCSP request based on the received certificate and sends the OCSP request to the OCSP responder 206. To construct the request, the server 204 extracts information such as serial number from the certificate and/or some other environment information (such as IP, user name, subject dn) that can be derived from the certificate information. The information put into the request may be used by the OCSP responder 206 to locate the certificate that needs to be validated. Then, it puts that information in an OCSP request.

Generally, the CA 08 may periodically automatically publish a CRL 110 to the OSCP server 206 at timed intervals. Alternatively, the OCSP responder 206 may send a CA request to the CA 208. The CA request typically includes a request for a CRL 210. This request to the CA may pass through a firewall 212 between the OCSP responder and the CA 208. The firewall 212 prevents unauthorized access to the CA where the CA's signing keys are kept. If a CA's signing key is stolen, the certificates may become compromised. Upon receipt of the request from the OCSP responder 206, the CA 208 returns a CRL 210 to the OCSP responder 206. Notably, the CA 208 does not search for a specific serial number 102 corresponding to the digital certificate in question, but rather returns a lengthy list representing revoked certificates.

Upon receipt of the CRL 210, the OCSP responder 206 stores the received CRL 210. Depending on the size of the CRL 210, the OCSP responder 206 may break the CRL into pieces which it may then store in memory 306 or on a storage device 310. The OCSP responder 206 searches the CRL 210 to see if the certificate in the original request is on the CRL 210 by determining if the serial number 102 of the certificate is represented in the CRL. If the OCSP responder 206 determines that it is included in the CRL 210, it determines that the certificate has been revoked. The OCSP responder 206 notifies the server 204 which, in turn, rejects the client's transaction request. If the OCSP responder 206 does not find the certificate's serial number on the CRL 210, it determines that it is valid. In this case, the OCSP responder 206 notifies the server 204 that made the original OCSP request, and the server 204 accepts the certificate, processes the client transaction, and returns the transaction results to the client 202.

Some systems pose a problem in that the CRL 210 that is returned to the OCSP responder 206 is a lengthy piece of data, that may be, for example, a hundred megabytes. The returned CRL contains much unneeded data because, typically, only the serial number(s) of the requested certificate(s) is desired, leaving the large majority of the information superfluous. This inefficient manner of verification not only presents bandwidth problems in the transmission of such large amounts of data from the CA 208 to an OCSP responder 206, but also storage problems because it is stored on the OCSP responder when received. The problem may compound when multiple OCSP requests are made to the CA 208, and multiple CRLs 210 are returned. These problems also reduce the speed in which electronic identifications can be verified. As such, answering an OCSP request with a CRL 210 may create inefficiency and unnecessary transmission and storage of large amounts of unrelated information. It is, therefore, desirable to overcome these and related problems.

SUMMARY OF THE INVENTION

In accordance with the present invention, a method in a data processing system for validating digital certificates is provided comprising the steps of receiving an online certificate status protocol request associated with a digital certificate, and creating a Lightweight Directory Access Protocol database query based on the received request. It further comprises sending the Lightweight Directory Access Protocol database query to determine whether the digital certificate is valid, and receiving a database query result indicating whether the digital certificate is valid.

Furthermore, in accordance with the present invention, a method in a data processing system for validating digital certificates is provided wherein the data processing system has a certificate authority and an associated database. The method comprises receiving, by a database, a Lightweight Directory Access Protocol query based on an online certificate status protocol request indicating a requested digital certificate, and searching the database for a database record reflecting an identity of the requested digital certificate. Further, it returns an indication of the database record when the database record reflecting the requested digital certificate is found to indicate validity of the requested digital certificate, whereby the indication of the database record is returned without transmission of a certificate revocation list by the certificate authority.

Additionally, in accordance with the present invention, a data processing system for answering online certificate status requests without certificate revocation lists is provided that comprises a memory having program instructions and a processor. The processor is configured to execute the program instructions to receive an online certificate status protocol request associated with a digital certificate, create a database query based on the received request, send the Lightweight Directory Access Protocol database query to determine whether the digital certificate is valid, and receive a Lightweight Directory Access Protocol database query result indicating whether the digital certificate is valid.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

The accompanying drawings, which are incorporated in and constitute a part of this specification, illustrate an embodiment of the invention and, together with the description, serve to explain the advantages and principles of the invention.

DETAILED DESCRIPTION

Methods and systems in accordance with the present invention efficiently validate digital certificates by answering OCSP requests without CRLs. During validation of digital certificates, they speed transmission, reduce required bandwidth and/or reduce required data storage by, for example, eliminating the need for the transmission of lengthy CRLs from a CA when verifying a digital certificate from a client.

In one implementation, methods and systems in accordance with the present invention enable requesters to pinpoint the existence of a digital certificate and check its validity by sending a database query, such as a Lightweight Directory Access Protocol ("LDAP") query, to a CA directory server associated with a CA. In this way, the status of digital certificates can be determined without requiring the CA to transmit a long list of data, such as a CRL. The CA directory server returns the query result, and if there is a matching certificate represented in the CA directory server, then the OCSP responder knows that the certificate is valid. The database query in the CA directory server is performed much faster than when an OCSP responder searches an entire CRL. Furthermore, the transmission of the database query result is a small piece of information and does not require the large amounts of data transmission bandwidth and storage as required with CRLs, thereby increasing validation speed.

Computer Architecture

Figure 3:
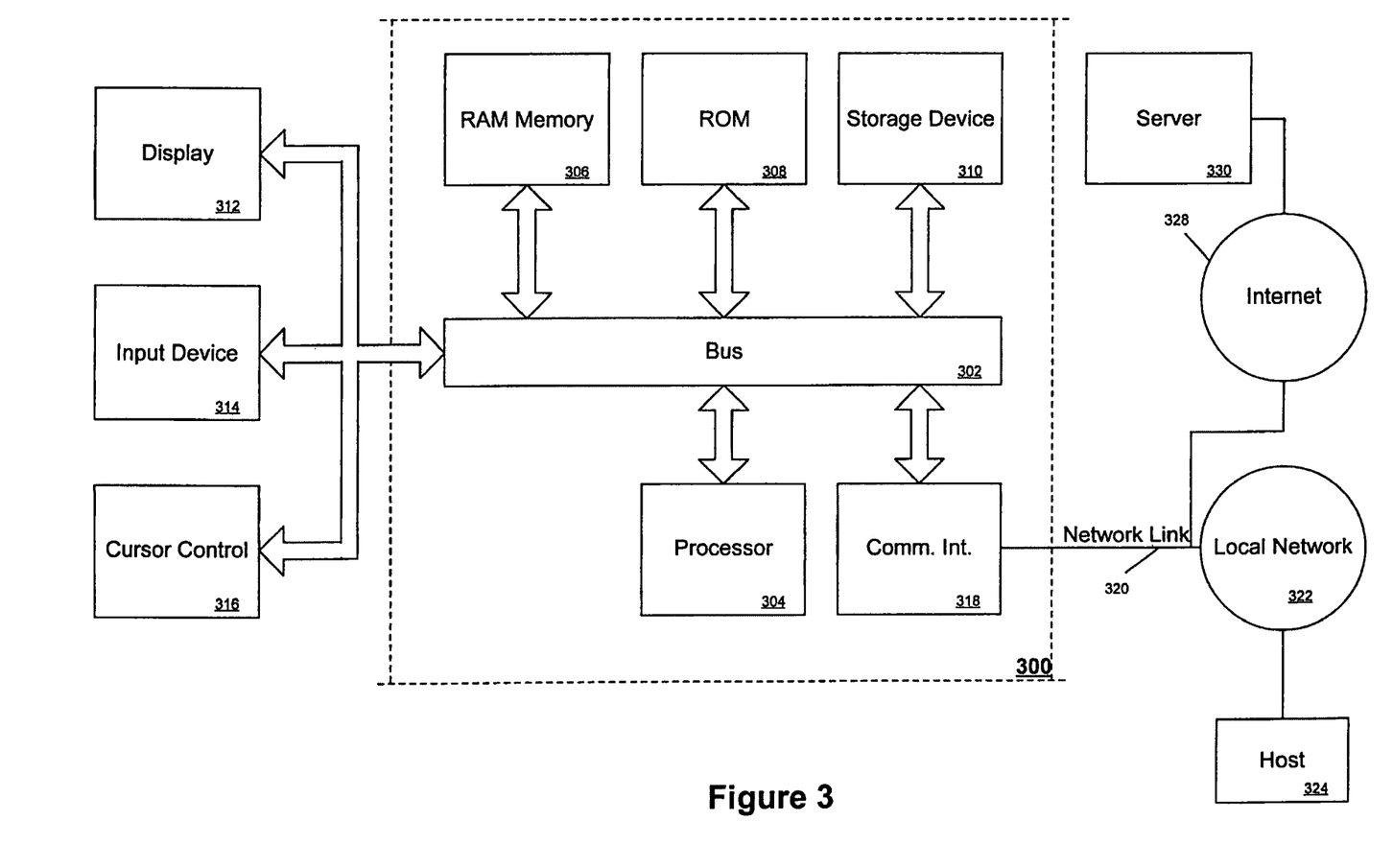
FIG. 3 shows an exemplary computer system suitable for use in accordance with the present invention.

FIG. 3 is a block diagram that illustrates a computer system 300 in which methods and systems consistent with the invention may be implemented. Computer system 300 may represent any of the computers discussed herein (e.g., client 202, Server 204, OCSP responder 206, CA 208, Certificate Authority directory server 402) and is not limited to a client or server or otherwise, and embodiments in accordance with the present invention are not limited to any specific combination of hardware and/or software.

Computer system 300 includes a bus 302 or other communication mechanism for communicating information, and a processor 304 coupled with bus 302 for processing information. Computer system 300 also includes a main memory 306, such as a random access memory ("RAM") or other dynamic storage device, coupled to bus 301 for storing information and instructions to be executed by processor 304. Computer system 300 further includes a read only memory ("ROM") 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube ("CRT"), for displaying information to a computer user. An input device 314, such as a keyboard, is coupled to bus 302 for communicating information and commands to processor 304. Another type of user input device is cursor control 316, such as a mouse, for communicating with processor 304 and for controlling cursor movement on display 312.

Computer system 300 also includes a communication interface 318 coupled to bus 302. Communication interface 318 provides a two-way data communication coupling to a network link 320 that may be connected to local network 322. For example, communication interface 318 may be a modem, for example, to provide a data communication connection. As another example, communication interface 318 may be a local area network ("LAN") card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to a wide area network ("WAN") such as the Internet 328. Local network 322 and Internet 328 both use electric, electromagnetic or optical signals that carry digital data streams. The signals through the various networks and the signals on network link 320 and through communication interface 318, which carry the digital data to and from computer system 300, are exemplary forms of carrier waves transporting the information.

System Details

LDAP is a protocol for accessing information directories. It supports TCP/IP which is widely used for Internet access. LDAP facilitates the accessing of directory information to various applications running on various computer platforms, and because LDAP is an open protocol, applications need not be concerned about the type of server hosting the directory.

A directory is like a database and generally tends to contain more descriptive, attribute-based information. The information in a directory is generally read much more often than it is written. As a consequence, directories usually do not implement the complicated transaction or roll-back schemes regular databases use for doing high-volume complex updates. Directory updates are typically simple all-or-nothing changes, if they are allowed at all. Directories are typically tuned to give quick responses to high-volume lookup or search operations. They also may have the ability to replicate information widely in order to increase availability and reliability, while reducing response time.

Different methods of providing a directory service allow different kinds of information to be stored in the directory, and place different requirements on how that information can be referenced, queried and updated, how it is protected from unauthorized access, etc. Some directory services are local, providing service to a restricted context while others are global, providing service to a much broader context (e.g., the Internet). Global services may also distributed, meaning that the data they contain is spread across many machines, all of which cooperate to provide the directory service.

Often information in directories is based on entries. In many implementations, the LDAP directory service model is based on entries that may be arranged in a hierarchical tree-like structure. An entry is a collection of attributes that has a name, called a distinguished name ("DN") that is used to uniquely refer to the entry. Furthermore, each of the entry's attributes may have a type and one or more values, and the values depend on what type of attribute it is.

For accessing the directory information, LDAP defines operations for interrogating and updating the directory. Operations are often provided for adding and deleting an entry from the directory, changing an existing entry, and changing the name of an entry. However, LDAP is most commonly used to search for information in the directory.

An LDAP search operation allows some portion of the directory to be searched for entries that match some criteria specified by a search filter, and information can be requested from each entry that matches the criteria.

LDAP directory services may be based on a client-server model, in which one or more LDAP servers contain the data making up the LDAP directory tree. A client typically connects to an LDAP server and asks it a question by submitting a query. The server responds with an answer (query results), or with a pointer to where the client can get more information (e.g., another LDAP server). In most global directory services, regardless of which LDAP server a client connects to, it sees the same view of the directory; a name presented to one LDAP server references the same entry it would at another LDAP server. LDAP is described in greater detail in "LDAP: Programming Directory-Enabled Applications with Lightweight Directory Access Protocol," Timothy Howes et al., MacMillan Technical Publishing (1997), and "Understanding and Deploying LDAP Directory Services," Timothy Howes et al., MacMillan Network Architecture and Development Series, New Riders Publishing (January 1999), which are incorporated herein by reference.

Figure 4:
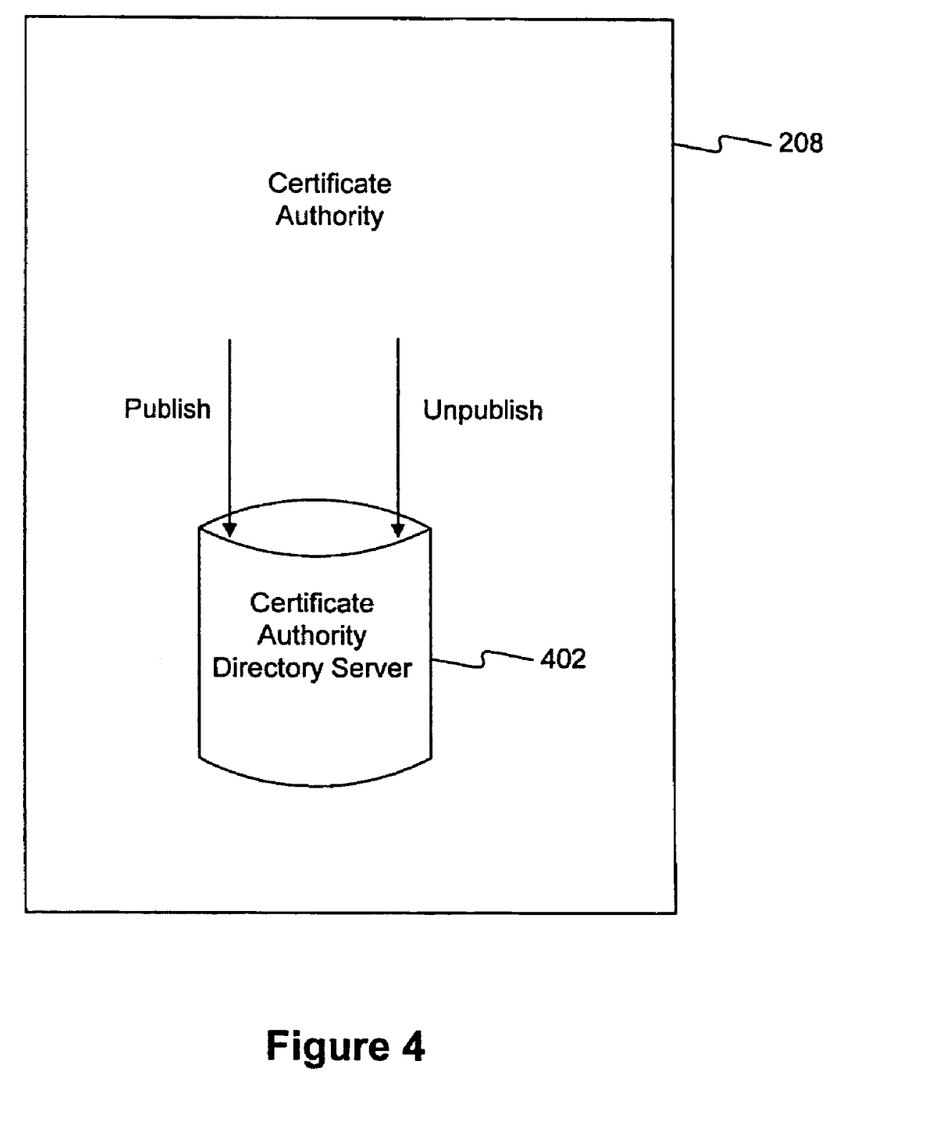
FIG. 4 illustrates a Certificate Authority and a Certificate Authority directory server in accordance with the present invention.

FIG. 4 shows that a CA 208 may be configured to publish or record a certificate to a CA directory server 402 when a certificate is issued and unpublished or delete the certificate when a certificate is revoked. In one implementation, a CA directory server 402 is a database that stores records reflecting certificates. When a CA 208 issues a new certificate, it publishes the certificate to the CA directory server 402 by creating a certificate record a certificate record which stores the issued certificate, and additional meta-information including a certificate status ("cert-status"). Since the certificate itself does not indicate if it is revoked or not, this piece of information specifies its status. In one implementation, the cert-status field may reflect a status of "valid," "invalid," "revoked," "expired," or "revoked_expired" by, for example, storing a value corresponding to each type of status. When the CA 208 revokes the certificate, it unpublishes it in the CA directory server 402 by sending it the appropriate cert-status information. In turn, the CA directory server 402 updates the corresponding database record. The CA directory server 402 keeps an up-to-date database of valid certificates, and this process helps implement the rapid and efficient validation of certificates.

Figure 5:
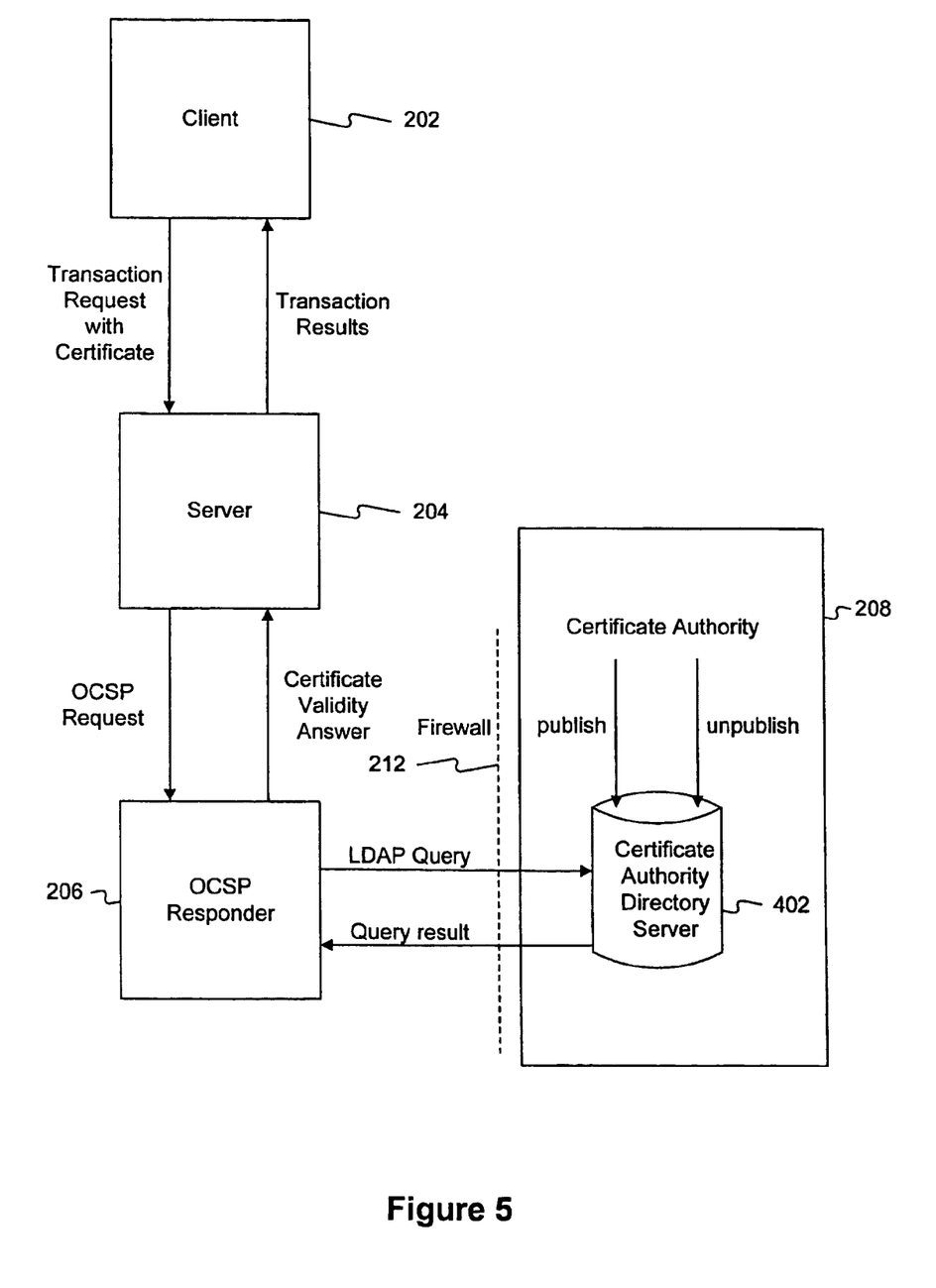
FIG. 5 depicts a system for answering OCSP requests without CRLs in accordance with the present invention.

FIG. 5 depicts a system for answering OCSP requests without CRLs 210 in accordance with the present invention. As can be seen on this figure, the OCSP responder 206 sends a database query, such as an LDAP query, to the CA directory server 402 instead of sending a CA request to the CA 208. In turn, the OCSP responder 206 receives a database query result indicating if a match was found, thereby indicating the existence of a valid certificate. Thus, it need not receive a large and cumbersome CRL 210 to validate the certificate.

Figure 6A:
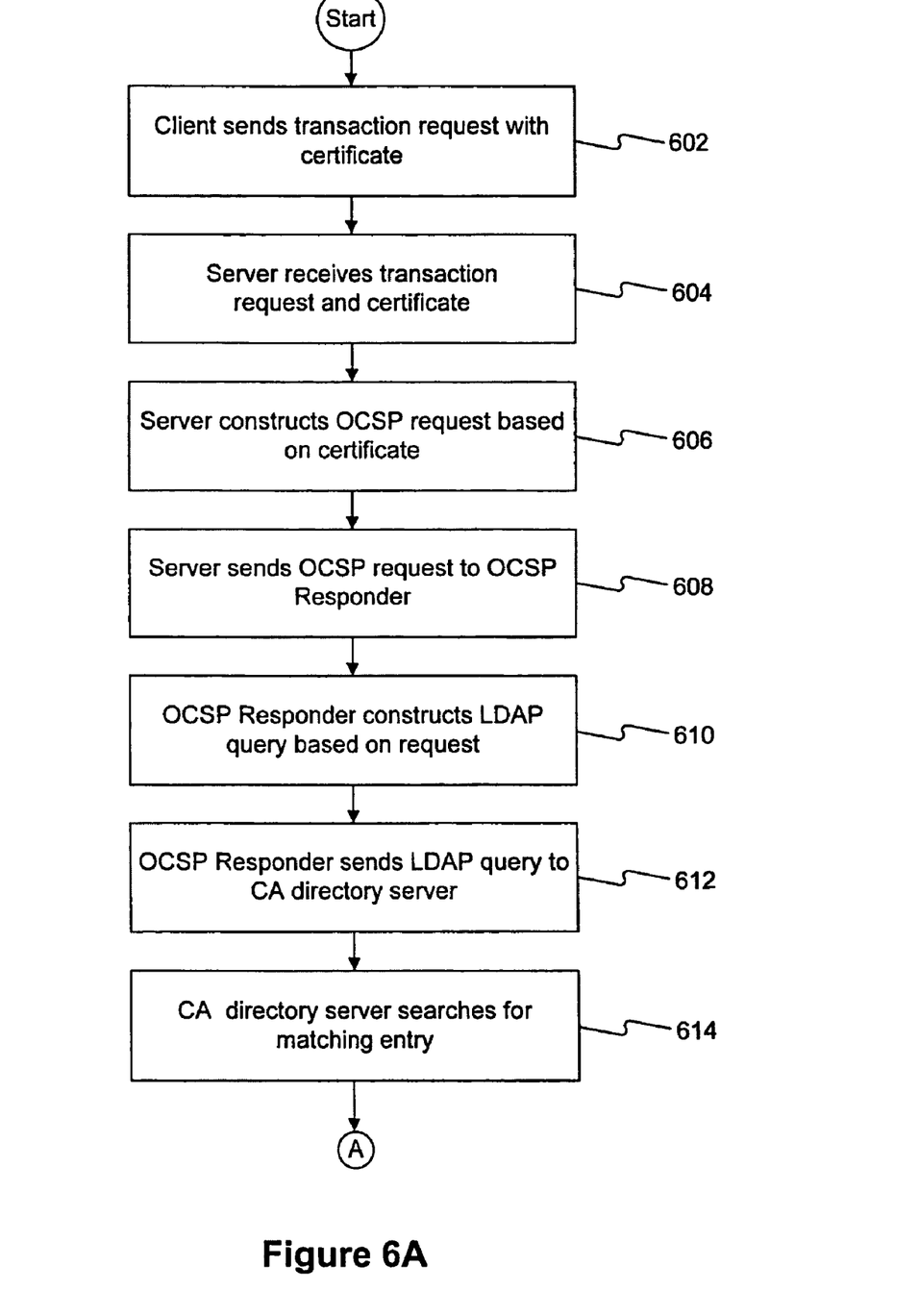
FIGS. 6A–B are flowcharts depicting steps for answering an OCSP request without CRLs in accordance with the present invention.
Figure 6B:
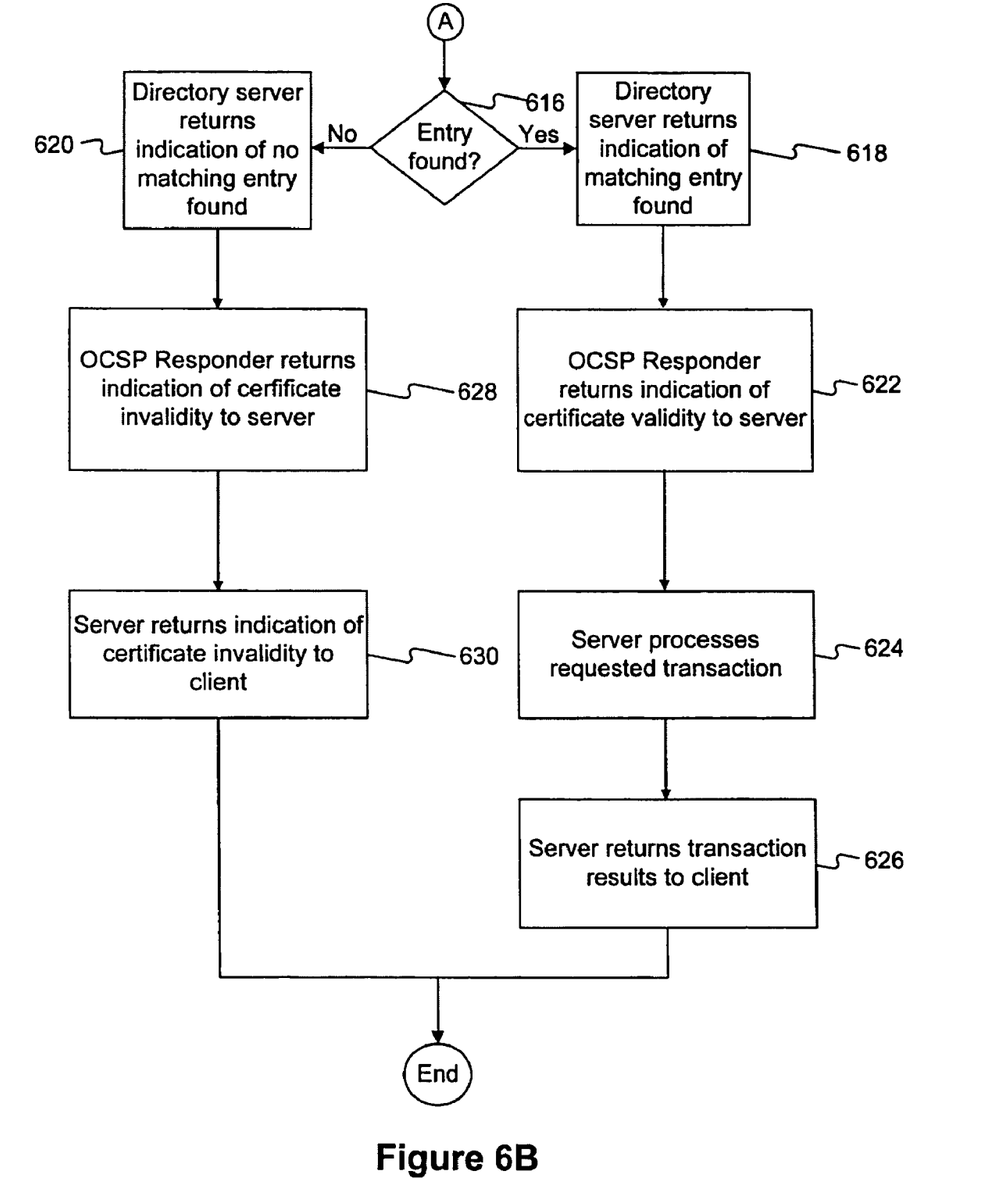

FIGS. 6A and 6B are flowcharts depicting steps for answering an OCSP request without CRLs 210 in accordance with the present invention, and they will be discussed in conjunction with FIG. 5 to illustrate an implementation in accordance with the present invention. First, the client 202 issues a transaction request to the server 204 with a certificate (step 602), and the server 204 receives the transaction request and certificate (step 604). Before executing a transaction, the server 204 verifies the certificate with the request by constructing an OCSP request based on the received certificate (step 606). In one implementation, the server extracts the serial number from the certificate and puts it in the OCSP request in the "CertID" field. The server 204 then sends the OCSP request to the OCSP responder 206 (step 608).

Next, the OCSP responder 206 constructs an LDAP query based on the certificate serial number 102 (step 610), for example, found in the "CertID" field of the OCSP request. The query may be constructed in one of many ways to uniquely identify the certificate. In some implementations, the LDAP query requests the entire database record corresponding to the certificate to be returned, and in other implementations, only the cert-status field is requested. One alternative constructs the query based on an extension that contains the subject name of the certificate. After construction of the query, it sends the request to the CA directory server 402 (step 612).

The CA directory server 402, which has records of valid certificates and optionally revoked certificates (as discussed in connection with FIG. 4), receives the query, searches accordingly (step 614) and returns an entry if the query is able to locate one. If a matching entry is found (step 616), the CA directory server 402 returns an indication that a matching entry was found (step 618), and this indication is typically a smaller piece of information than a CRL 210. Upon receipt, the OCSP responder 206 then considers the certificate valid, and notifies the server 204 (step 622) which accepts the certificate and processes the originally requested client transaction (step 624) and returns the results to the client 202 (step 626).

If the CA directory server 402 does not find a matching entry (step 616), it notifies the OCSP responder 206 (step 620) which then considers the certificate revoked, unknown, invalid or expired. The OCSP responder 204 notifies the server 204 that made the OCSP request (step 628), and that server rejects the client's transaction request (step 630).

Other embodiments of the invention will be apparent to those skilled in the art from consideration of the specification and practice of the invention disclosed herein. For example, server 204 may be configured to generate and send LDAP queries to CA 208 and process results of these queries. Furthermore embodiments of the present invention may be implemented by computer programs that may be stored on computer-readable media. It is intended that the specification and examples be considered as exemplary, with a true scope and spirit of the invention being indicated by the following claims.

What is claimed is:

1. A method in a data processing system for validating digital certificates having a server, an Online Certificate Status Protocol (OCSP) responder, and a certificate authority associating a certificate database including records associated with digital certificates, the method comprising:

receiving, at the OCSP responder, an OCSP request associated with a digital certificate generated by the server;

creating, by the OCSP responder, a Lightweight Directory Access Protocol database query based on the received OCSP request;

sending, by the OCSP responder, the Lightweight Directory Access Protocol database query to the certificate database associated with the certificate authority to determine whether the digital certificate is valid;

receiving, at the OCSP responder, a database query result indicating whether the digital certificate matches a corresponding certificate entry stored in one of the certificate database records, wherein the certificate database records store certificates and corresponding certificate information reflecting status of the certificate, permissible values of the certificate information including at least "valid," "invalid," "revoked," "expired," and "revoked expired";

determining, by the OCSP responder, the validity of the digital certificate based on the database query result; and notifying the server of the determined validity of the digital certificate.

2. The method of claim 1, wherein the Lightweight Directory Access Protocol database query includes an instruction to return a selected portion of a database record.

3. The method of claim 1, wherein the method further comprises:

sending an indication of a new digital certificate from the certificate authority to the certificate database upon issuance of the new digital certificate;

receiving, by the certificate database, from the certificate authority, an indication of the new digital certificate; and creating a certificate database record reflecting an identity of the new digital certificate.

4. The method of claim 1, wherein the method further comprises:

sending an indication of a revoked digital certificate from the certificate authority to the certificate database upon revocation of the revoked digital certificate;

receiving, by the certificate database, from the certificate authority, the indication of revocation of the revoked digital certificate; and removing a certificate database record associated with the revoked digital certificate from the certificate database.

5. A method in a data processing system for validating digital certificates without certification revocation lists, the data processing system having a client, a server, a responder, a certificate authority associating a database storing records of valid digital certificates of the certificate authority, the method comprising:

generating, by the client, a request for a transaction, the request including a digital certificate identifying the client;

receiving the client request by the server;

creating, by the server, an online certificate status protocol request based on the associated digital certificate identifying the client;

sending, by the server, the online certificate status protocol request to the responder;

receiving, by the responder, the online certificate status protocol request associated with the digital certificate;

creating, by the responder, a Lightweight Directory Access Protocol database query based on the received online certificate status protocol request;

sending, by the responder, the Lightweight Directory Access Protocol database query to the database associated with the certificate authority to determine whether the digital certificate is valid;

searching the database for a database record identifying the digital certificate associated with the online certificate status protocol request, wherein the certificate database record stores a certificate and corresponding certificate information reflecting status of the certificate, permissible values of the certificate information including at least "valid," "invalid," "revoked," "expired," and "revoked expired";

returning a LDAP database query result indicating whether the database record identifying the digital certificate is stored in the database;

sending, by the responder, a validity indication whether the digital certificate is valid based on the query result to the server; and sending, by the server to the client, an indication of whether the transaction is authorized based on the validity indication.

6. A data processing system for answering online certificate status requests without certificate revocation lists, comprising:

a memory having program instructions;

a processor configured to execute the program instructions to:

receive from a server an online certificate status protocol request associated with a digital certificate, create a Lightweight Directory Access Protocol database query based on the received request, send the Lightweight Directory Access Protocol database query to a database associated with a certificate authority to determine whether the digital certificate is valid, receive a Lightweight Directory Access Protocol database query result from the database indicating whether the digital certificate matches a corresponding entry stored in a database one of the certificate database records, wherein the certificate database records store certificates and corresponding certificate information reflecting status of the certificate, permissible values of the certificate information including at least "valid," "invalid," "revoked," "expired," and "revoked expired", determine the validity of the digital certificate based on the database query result, and notify the server of the determined validity of the digital certificate.

7. A data processing system for answering online certificate status requests without certificate revocation lists, comprising:

a client computer configured to send a request for a transaction, the request including a digital certificate identifying the client;

a server computer configured to receive the client request, create an online certificate status protocol request based on the associated digital certificate identifying the client, and send the online certificate status protocol request;

an OCSP responder configured to receive the online certificate status protocol request associated with the digital certificate, create a Lightweight Directory Access Protocol database query based on the received online certificate status protocol request, and send the Lightweight Directory Access Protocol database query to determine whether the digital certificate is valid;

a certificate authority that provides valid digital certificates; and a database associated with the certificate authority storing records of valid certificates of the certificate authority and configured to search for a database record identifying the digital certificate associated with the online certificate status protocol request, return an LDAP database query result indicating whether the digital certificate matches one of the records stored in the database, wherein the certificate database records store certificates and corresponding certificate information reflecting status of the certificate, permissible values of the certificate information including at least "valid," "invalid," "revoked," "expired," and "revoked expired", wherein the OCSP responder determines that the digital certificate is valid when it receives an LDAP database query result reflecting that the digital certificate matches one of the database records.

8. A computer-readable medium containing instructions for controlling a data processing system to perform a method for validating digital certificates, the data processing system having a server, an Online Certificate Status Protocol (OCSP) responder, a certificate authority associating a certificate database including records associated with digital certificates, the method comprising the steps of:

receiving, at the OCSP responder, an OCSP request associated with a digital certificate generated by the server; creating, by the OCSP responder, a Lightweight Directory Access Protocol database query based on the received OCSP request;

sending, by the OCSP responder, the Lightweight Directory Access Protocol database query to the certificate database associated with the certificate authority to determine whether the digital certificate is valid;

receiving, at the OCSP responder, a database query result indicating whether the digital certificate matches a corresponding certificate entry stored in one of the certificate database records, wherein the certificate database records store certificates and corresponding certificate information reflecting status of the certificate, permissible values of the certificate information including at least "valid," "invalid," "revoked," "expired," and "revoked expired";

determining, by the OCSP responder, the validity of the digital certificate based on the database query result; and notifying the server of the determined validity of the digital certificate.

9. The computer-readable medium of claim 8, wherein the Lightweight Directory Access Protocol database query includes an instruction to return a selected portion of a database record.

10. The computer-readable medium of claim 8, wherein the method further comprises:

sending an indication of a new digital certificate from the certificate authority to the database upon issuance of the new digital certificate;

receiving, by the database, from the certificate authority, an indication of the new digital certificate; and storing a database record reflecting an identity of the new digital certificate.

11. The computer-readable medium of claim 8, wherein the method further comprises:

sending an indication of a revoked digital certificate from the certificate authority to the database upon revocation of the revoked digital certificate;

receiving, by the database, from the certificate authority, the indication of revocation of the revoked digital certificate; and removing a database record of an identity of the revoked digital certificate.

12. A computer-readable medium containing instructions for controlling a data processing system to perform a method for validating digital certificates, the data processing system having a certificate authority and a directory server having an associated database, the method performed by the directory server comprising:

maintaining a database of valid digital certificates;

receiving a Lightweight Directory Access Protocol query based on an online certificate status protocol request indicating a requested digital certificate;

searching the database for a database record reflecting an identity of the requested digital certificate; and returning an indication of the database record when the database record reflecting the requested digital certificate is found to indicate validity of the requested digital certificate, whereby the indication of the database record includes meta-data reflecting the validity of the requested digital certificate, permissible values of the meta-data including at least "valid," "invalid," "revoked," "expired," and "revoked expired".

13. The computer-readable medium of claim 12, wherein maintaining a database further comprises:

sending an indication of a new digital certificate from the certificate authority to the database upon issuance of the new digital certificate;

receiving, by the database from the certificate authority, an indication of the new digital certificate upon issuance of the new digital certificate; and storing a database record reflecting an identity of the new digital certificate.

14. A computer-readable medium containing instructions for controlling a data processing system to perform a method for validating digital certificates without certification revocation lists, the data processing system having a client, a server, an responder, a certificate authority associating a database storing records of valid digital certificates of the certificate authority, the method comprising:

generating, by the client, a request for a transaction, the request including a digital certificate identifying the client;

receiving the client request by the server;

creating, by the server, an online certificate status protocol request based on the associated digital certificate identifying the client;

sending, by the server, the online certificate status protocol request to the responder;

receiving, by the responder, the online certificate status protocol request associated with the digital certificate;

creating, by the responder, a Lightweight Directory Access Protocol database query based on the received online certificate status protocol request;

sending, by the responder, the Lightweight Directory Access Protocol database query to the database associated with the certificate authority to determine whether the digital certificate is valid;

searching the database for a database record identifying the digital certificate associated with the online certificate status protocol request, wherein the certificate database record stores a certificate and corresponding certificate information reflecting status of the certificate, permissible values of the certificate information including at least "valid," "invalid," "revoked," "expired," and "revoked expired";

returning a LDAP database query result indicating whether the digital certificate the database record is stored in the database;

sending, by the responder, a validity indication whether the digital certificate is valid based on the query result to the server; and sending, by the server to the client, an indication of whether the transaction is authorized based on the validity indication.

15. A data processing system for validating digital certificates, comprising:

means for receiving an OCSP request associated with a digital certificate generated by a server;

means for creating a Lightweight Directory Access Protocol database query based on the received OCSP request;

means for sending the Lightweight Directory Access Protocol database query to a certificate database associated with a certificate authority including records associated with digital certificates to determine whether the digital certificate is valid;

means for receiving a database query result indicating whether the digital certificate matches a corresponding certificate entry stored in one of the certificate database records, wherein the certificate database records store certificates and corresponding certificate information reflecting status of the certificate, permissible values of the certificate information including at least "valid," "invalid," "revoked," "expired," and "revoked expired";

means for determining the validity of the digital certificate based on the database query result; and means for notifying the server of the determined validity of the digital certificate.

16. The method according to claim 1, wherein
the server and the OCSP responder reside in a first computer network,
the certificate authority and the certificate database reside in a second computer network, and
the first computer network is connected to the second computer network via a computer network firewall.

* * * * *